Patented Nov. 12, 1935

2,020,690

UNITED STATES PATENT OFFICE 2,020,690

PREPARATION OF ALKYLENE DIAMINES

Werner M. Lauter, Akron, Ohio, assignor to Wingfoot Corporation, Wilmington, Del., a corporation of Delaware No Drawing. Application September 12, 1931, Serial No. 562,607

17 Claims. (Cl. 260—127)

My invention relates to the manufacture of basic organic compounds and it has particular relation to the manufacture of diamines of aliphatic hydrocarbons.

One object of the invention is to provide a method of preparing diamines of aliphatic hydrocarbons in which much higher yields are obtained than by methods which have heretofore been employed.

Another object of the invention is to provide a method of preparing the above indicated compounds in which the excess of ammonia requisite to the preparation is reduced to a minimum.

Other objects and advantages will become apparent from the following description.

In the manufacture of ethylene diamine and similar aliphatic diamines, it has heretofore been customary to intermix a dichloride of the desired hydrocarbon with ammonia and subject the mixture to heat and pressure in an autoclave. Such methods are highly inefficient because from six to twenty times the theoretically required amount of ammonia is necessary in order to effect a reaction. Also, even where these enormous excesses of ammonia are employed, the yields amount only to 18 or 20 percent of the theoretically possible value. Manifestly, the process is highly uneconomical and, as a result, the cost of ethylene diamine has been excessive.

My invention resides in the discovery that diamines of aliphatic hydrocarbons may readily be prepared from corresponding dihalides with the use of relatively slight excesses of ammonia and in excellent yields merely by the addition of a salt or oxide of a relatively heavy metal such as cuprous chloride (CuCl), copper sulphate, zinc chloride ($ZnCl_2$), or zinc oxide. Because of the expense of bromides, dichlorides are generally used but the dibromides will work equally well. As an example of this specific method of preparing diamines, the preparation of ethylene diamine will be described in detail.

Ethylene dichloride in the proportion of substantially 500 grams by weight is intermixed with 1800 cubic centimeters of concentrated (26%) ammonium hydroxide and 400 grams of cuprous chloride (CuCl). This mixture is placed in an autoclave and subjected to a temperature of approximately 95 degrees C. for a period of approximately two hours at a pressure range of from 150 to 300 pounds per square inch. During this period, it is desirable that the mixture be subjected to constant stirring. At the conclusion of the reaction period, the resultant material is treated with a slight excess of sodium hydroxide and is then subjected to distillation in a column still for purposes of separating the ethylene diamine. The latter material is obtained from this distillation in yields which vary from 60 to 82 percent.

If it is desired, zinc chloride ($ZnCl_2$), zinc oxide, copper sulphate or certain salts of other heavy metals may be substituted for cuprous chloride in the above described reaction. If zinc chloride is employed, 350 grams are sufficient for the purpose.

The mechanics of the reactions involved in the preparation of ethylene diamine are not completely understood. However, it appears that highly complex salts of the metal salts or metal oxides, ethylene diamine and ammonia are formed and that these salts, upon treatment with an alkali, such as sodium hydroxide, are broken up and the desired diamine is evolved. The metal salt employed to effect the reaction may readily be recovered and employed in succeeding reactions.

It is, of course, to be understood that any metal salt or metal oxide capable of forming complex salts with ethylene diamine and with ammonia may be employed in lieu of the chlorides, oxides or sulphates of zinc or copper. Also, any convenient hydrolyzing agent may be employed in lieu of sodium hydroxide. However, the latter compound is highly desirable from a commercial standpoint because it is relatively cheap.

The above described methods of procedure are not limited to the manufacture of ethylene diamines but may also be employed in the manufacture of diamines of other hydrocarbons such as propylene diamine and butylene diamine. The only essential changes in the methods of procedure involved consist in the substitution of the desired halide for ethylene dihalide. It is thus apparent that the invention involves a relatively simple method of preparing diamines in which the use of great excesses of ammonia is avoided and in which the desired compound is obtained in much higher yields than is possible where the ordinary methods of procedure are employed.

Although certain theories have been set forth to aid in explanation of the invention, it is to be understood that the invention is not to be limited thereby, and although only the preferred forms of the invention have been described, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. In the process of manufacturing ethylene diamine by reacting ethylene dichloride with ammonia under superatmospheric conditions of temperature and pressure, the step which comprises reacting the ethylene dichloride and the ammonia in the presence of cuprous chloride.

2. In the process of manufacturing ethylene diamine by reacting ethylene dichloride with ammonia under superatmospheric conditions of temperature and pressure, the step which comprises reacting the ethylene dichloride and the ammonia in the presence of copper sulphate.

3. In the process of manufacturing ethylene diamine by reacting ethylene dichloride with ammonia under superatmospheric conditions of temperature and pressure, the step which comprises reacting the ethylene dichloride and the ammonia in the presence of sufficient copper sulphate to form a complex salt with substantially all the resulting ethylene diamine.

4. In the process of manufacturing ethylene diamine by reacting ethylene dichloride with aqueous ammonia under superatmospheric conditions of temperature and pressure, the step which comprises reacting the ethylene dichloride and the ammonia in the presence of a material selected from the group consisting of chlorides, sulphates and oxides of copper and zinc.

5. In the process of manufacturing ethylene diamine by reacting ethylene dichloride with aqueous ammonia under superatmospheric conditions of temperature and pressure, the step which comprises reacting the ethylene dichloride and the ammonia in the presence of a material selected from the group consisting of chlorides, sulphates and oxides of copper and zinc, said material being present in sufficient amount to form a complex salt with substantially all the resulting ethylene diamine.

6. In the process of manufacturing ethylene diamine by reacting an ethylene dihalide with ammonia under superatmospheric conditions of temperature and pressure, the step which comprises reacting the ethylene dihalide and the ammonia in the presence of a material selected from the group consisting of chlorides, sulphates and oxides of copper and zinc.

7. In the process of preparing alkylene diamines by reacting an alkylene dichloride with ammonia under superatmospheric conditions of temperature and pressure, the step which comprises reacting the alkylene dichloride and the ammonia in the presence of a material selected from the group consisting of chlorides, sulphates and oxides of copper and zinc, said material being present in sufficient amount to form a complex salt with substantially all the resulting alkylene diamine.

8. In the process of preparing alkylene diamines by reacting an alkylene dihalide with ammonia under superatmospheric conditions of temperature and pressure, the step which comprises reacting the alkylene dihalide and the ammonia in the presence of a material selected from the group consisting of chlorides, sulphates and oxides of copper and zinc, said material being present in sufficient amount to form a complex salt with substantially all the resulting alkylene diamine.

9. In the process of manufacturing ethylene diamine by reacting ethylene dichloride with ammonia under superatmospheric conditions of temperature and pressure, the step which comprises reacting the ethylene dichloride and the ammonia in the presence of a metal compound which forms a complex salt with the resulting ethylene diamine.

10. In the process of manufacturing ethylene diamine by reacting ethylene dichloride with ammonia under superatmospheric conditions of temperature and pressure, the step which comprises reacting the ethylene dichloride and the ammonia in the presence of a metal salt which forms a complex salt with the resulting ethylene diamine, said salt being present in sufficient amount to form a complex salt with substantially all the resulting ethylene diamine.

11. In the process of manufacturing ethylene diamine by reacting ethylene dischloride with ammonia under superatmospheric conditions of temperature and pressure, the step which comprises reacting the ethylene dichloride and the ammonia in the presence of a metal halide which forms a complex salt with the resulting ethylene diamine.

12. In the process of manufacturing ethylene diamine by reacting ethylene dichloride with ammonia under superatmospheric conditions of temperature and pressure, the step which comprises reacting the ethylene dichloride and the ammonia in the presence of a metal sulphate which forms a complex salt with the resulting ethylene diamine.

13. In the process of manufacturing ethylene diamine by reacting ethylene dichloride with ammonia under superatmospheric conditions of temperature and pressure, the step which comprises reacting the ethylene dichloride and the ammonia in the presence of a copper salt which forms a complex salt with the resulting ethylene diamine.

14. In the process of manufacturing ethylene diamine by reacting ethylene dichloride with ammonia under superatmospheric conditions of temperature and pressure, the step which comprises reacting the ethylene dichloride and the ammonia in the presence of a zinc salt which forms a complex salt with the resulting ethylene diamine.

15. In the process of preparing alkylene diamines by reacting an alkylene dichloride with ammonia under superatmospheric conditions of temperature and pressure, the step which comprises reacting the alkylene dichloride and the ammonia in the presence of a metal compound which forms a complex salt with the resulting alkylene diamine, said compound being present in sufficient amount to form a complex salt with substantially all the resulting alkylene diamine.

16. In the process of preparing alkylene diamines by reacting an alkylene dihalide with ammonia under superatmospheric conditions of temperature and pressure, the step which comprises reacting the alkylene dihalide and the ammonia in the presence of a metal compound which forms a complex salt with the resulting alkylene diamine.

17. In the process of preparing alkylene diamines by reacting an alkylene dihalide with ammonia under superatmospheric conditions of temperature and pressure, the step which comprises reacting the alkylene dihalide and the ammonia in the presence of a metal salt which forms a complex salt with the resulting alkylene diamine, said salt being present in sufficient amount to form a complex salt with substantially all the resulting alkylene diamine.

WERNER M. LAUTER.